(12) United States Patent
Lentjes et al.

(10) Patent No.: US 12,070,041 B2
(45) Date of Patent: Aug. 27, 2024

(54) APPARATUS AND METHOD FOR RECOVERING LIVER FROM POULTRY CARCASSES OR PARTS THEREOF

(71) Applicant: BAADER FOOD SYSTEMS DENMARK A/S, Trige (DK)

(72) Inventors: Martijn Hendrikus Lentjes, BM Doesburg (NL); Koen van der Veen, BM Doesburg (NL); Gerhard Albertus Willemsen, BM Doesburg (NL); Daan Thiele, BM Doesburg (NL)

(73) Assignee: BAADER FOOD SYSTEMS DENMARK A/S, Trige (DK)

( * ) Notice: Subject to any disclaimer, the term of this patent is extended or adjusted under 35 U.S.C. 154(b) by 151 days.

(21) Appl. No.: 17/778,992

(22) PCT Filed: Nov. 29, 2019

(86) PCT No.: PCT/EP2019/083162
§ 371 (c)(1),
(2) Date: May 23, 2022

(87) PCT Pub. No.: WO2021/104650
PCT Pub. Date: Jun. 3, 2021

(65) Prior Publication Data
US 2022/0408741 A1 Dec. 29, 2022

(51) Int. Cl.
*A22C 21/06* (2006.01)
*A22C 21/00* (2006.01)

(52) U.S. Cl.
CPC .......... *A22C 21/0053* (2013.01); *A22C 21/06* (2013.01)

(58) Field of Classification Search
CPC ............................ A22C 21/0053; A22C 21/06
(Continued)

(56) References Cited

U.S. PATENT DOCUMENTS 3,902,221 A * 9/1975 Harben, Jr. ............ A22C 21/06
452/118
4,466,158 A * 8/1984 DeLong ................. A22C 17/14
452/113
(Continued)

FOREIGN PATENT DOCUMENTS

CN 1368009 A 9/2002
DE 60211964 T2 1/2007
(Continued)

OTHER PUBLICATIONS

International Search Report dated Jul. 28, 2020; International Application PCT/EP2019/083162.

*Primary Examiner* — David J Parsley
(74) *Attorney, Agent, or Firm* — Dinsmore & Shohl LLP

(57) ABSTRACT

An apparatus and method for recovering liver from viscera sets of poultry carcasses, the viscera sets including at least lungs, liver, proventriculus and gizzard, which are connected together at least in part by connective tissue, has at least one holding element. The at least one holding element has a receiving region for receiving and for holding the viscera set, configured such that at least the lungs can be arranged above the receiving region and at least the liver can be arranged beneath the receiving region. A detaching device has a detaching section with a detaching member for detaching the liver, configured such that at least a connective tissue connecting the liver with the viscera set can be detached in some regions by the detaching member. A separating device has a separating member configured such that the liver detached from the connective tissue can be separated completely from the viscera set.

28 Claims, 9 Drawing Sheets

(58) Field of Classification Search
USPC .................................................. 452/111, 112
See application file for complete search history.

(56) References Cited

U.S. PATENT DOCUMENTS

| | | | |
|---|---|---|---|
| 4,951,352 A | | 8/1990 | Harbin |
| 5,041,053 A | * | 8/1991 | Ellis ..................... A22C 21/06 |
| | | | 452/120 |
| 5,098,333 A | | 3/1992 | Cobb |
| 5,152,715 A | * | 10/1992 | van de Eerden ...... A22C 17/14 |
| | | | 452/120 |
| 5,186,678 A | * | 2/1993 | Conner .................. A22C 21/06 |
| | | | 452/106 |
| 5,318,428 A | * | 6/1994 | Meyn ..................... A22C 21/06 |
| | | | 452/106 |
| 5,569,067 A | * | 10/1996 | Meyn ....................... A22B 5/18 |
| | | | 452/106 |
| 2002/0102932 A1 | | 8/2002 | Minemura et al. |
| 2003/0148725 A1 | | 8/2003 | Jensen et al. |

FOREIGN PATENT DOCUMENTS

| | | |
|---|---|---|
| EP | 0541150 A1 | 5/1993 |
| EP | 0679336 A1 | 11/1995 |
| EP | 1222858 A2 | 7/2002 |
| EP | 2803273 A1 | 11/2014 |
| NL | 1001672 C1 | 5/1997 |
| WO | 2017072063 A1 | 5/2017 |

\* cited by examiner

APPARATUS AND METHOD FOR RECOVERING LIVER FROM POULTRY CARCASSES OR PARTS THEREOF

CROSS-REFERENCE TO RELATED APPLICATIONS

This application is the U.S. National Stage of PCT/EP2019/083162 filed on Nov. 29, 2019, the entire content is incorporated herein by reference in its entirety.

FIELD OF THE INVENTION

The invention relates to an apparatus configured and adapted for recovering liver or parts thereof from viscera sets of poultry carcasses.

The invention relates further to a method for recovering liver or parts thereof from viscera sets of poultry carcasses.

BACKGROUND OF THE INVENTION

Such apparatuses and methods are used in the poultry processing industry to detach liver or parts thereof fully automatically or semi-automatically from viscera sets or parts of viscera sets (referred to generally as viscera sets hereinbelow) of an eviscerated poultry carcass or parts thereof, or to separate it completely from the viscera set.

After the industrial slaughter of poultry, the viscera sets which have been removed generally comprise at least heart, liver, lungs, kidneys, gall bladder, oesophagus, gizzard, proventriculus and intestines. A particularly important aspect of the process of separating the viscera is the separation of edible parts from inedible parts. Typically, the intestines and the gall bladder are perceived as being inedible parts, while at least the liver, heart and gizzard are perceived as being edible parts. The separation of the liver from inedible parts is a particular challenge, because the liver generally locally adjoins inedible parts of the viscera set. If processing is not carried out properly, the inedible parts of the viscera sets may lead to contamination of the liver if, for example, the gall bladder or the intestines are mechanically damaged by processing tools during the separation of the liver.

In poultry slaughtering processes, the focus is generally on the efficient recovery of flesh parts, such as, for example, breast meat, drumsticks, wings, etc. The viscera sets are mainly obtained as by-products in the slaughter of poultry. In addition to the above-mentioned flesh parts, individual viscera of poultry can also be used economically, so that separation into economically usable viscera as by-products and waste products is expedient. In recent years, viscera of poultry have gained popularity, so that in the poultry processing industry too, by opening up new sales markets, increasing use is being made of the viscera in the food processing industry. For that purpose it is, however, necessary for the individual viscera to be separate in order to ensure homogeneous further processing and sale.

Accordingly, the separation of the viscera nowadays constitutes an important part of the poultry slaughtering process. For the processing of poultry, the two most important parameters are speed and quality. Modern poultry slaughtering systems are capable of working at a processing speed of over 100 to 200 animals per minute. Such a processing speed is also desirable for the production of all by-products in order to be able to achieve frictionless interaction of the individual processes. Because the value of the systems is directly proportional to their processing speed, even the smallest fluctuations within the interacting processes can lead to disruptions in the operating procedures as a whole. Increasing the processing speed of individual processes, on the other hand, may be expedient because the processing speed of the process as a whole can be increased in this manner. However, increasing the processing speed should not result in a corresponding fall in quality.

It is well known that liver is separated from viscera sets manually by specific cuts. However, this procedure cannot be carried out economically in particular in countries with high labour costs. Furthermore, only low processing speeds are possible with manual processing and treatment of viscera sets, so that a large number of personnel is required for a high throughput. Furthermore, the processing steps cannot be integrated into existing industrial food processing processes, or can be integrated only with a large outlay in terms of logistics.

In the past, the mechanical further processing of viscera sets generally took place on secondary apparatuses which had lower processing speeds. Modern apparatuses for processing viscera sets are frequently capable of performing satisfactory separation of the viscera sets only with the aid of manual labour. The currently existing fully automatic apparatuses for separating individual viscera from the viscera sets have extremely complex technical process and structural features, so that they are particularly cost-intensive and susceptible to faults. Furthermore, the modern apparatuses are generally capable of providing only low qualities of the end products, since on the one hand relatively large areas of the viscera to be separated are damaged in the separation operation, and on the other hand contamination with inedible viscera occurs, so that only limited use of the separated viscera is possible, for example in the production of animal feed.

Apparatuses exist in which parts of viscera sets, for example the liver, are separated from the remaining viscera by means of roller-like elements which rotate in opposite directions. However, this apparatus is not suitable in equal measure for all the viscera to be separated. When separating the liver from a viscera set, it is necessary that a clean pre-separated viscera set is already present; further upstream process steps are thus necessary. In addition, processing viscera by means of roller-like elements rotating in opposite directions increases the risk that the viscera will be damaged during the processing step, so that on the one hand the quality of the end product is reduced and on the other hand contamination with undesirable by-products can occur in the products to be separated.

Accordingly, the object underlying the invention is to provide an apparatus which ensures safe, reliable and efficient recovery of liver or parts thereof from viscera sets of poultry carcasses. The object further consists in proposing a corresponding method.

SUMMARY OF THE INVENTION

This object is achieved by the apparatus mentioned hereinbefore, wherein the viscera sets comprise at least lungs, liver, proventriculus and gizzard, which are connected together at least in part by connective tissue, comprising a viscera conveying device, adapted to convey the viscera sets in a suspended manner along a conveying line in a transport direction T, having a drive unit and a conveying element for conveying at least one holding element, wherein the at least one holding element comprises a receiving region for receiving and for holding the viscera set or parts thereof, and wherein the holding element is so configured that at least the lungs can be arranged above the receiving region and at least the liver, the proventriculus and the gizzard can be arranged below the receiving region, a detaching device, arranged in the transport direction T along the conveying line, having a detaching section, comprising a detaching means for detaching the liver, wherein the detaching device is so configured that at least a connective tissue connecting the liver with the viscera set can be detached from the viscera set in some regions by the detaching means, a separating device, arranged downstream of the detaching device in the transport direction T along the conveying line, comprising a separating means, wherein the separating means is so configured that the liver detached from the connective tissue can be separated completely from the viscera set.

Viscera sets within the meaning of the invention are to be understood as being viscera which have been removed following slaughter and which are connected together naturally by connective tissue. Viscera sets are also referred to as intestine sets, intestine packets or the like. Viscera sets are accordingly to be understood within the meaning of the invention as being all the connected viscera of poultry carcasses, which comprise at least lungs, liver, proventriculus and gizzard. Generally, such viscera sets comprise further viscera, in particular heart, gall bladder, oesophagus, trachea, kidneys, intestines or others, such viscera sets can likewise be processed with the apparatus according to the invention.

The viscera sets are connected together by connective tissue. Connective tissue within the meaning of the invention is to be understood as being all the connections which occur between the viscera of poultry. Connective tissue includes in particular fatty tissue, cartilaginous tissue, sinews, ligaments, (blood) vessels and skin. The connective tissue connects the viscera of poultry naturally. On account of the connective tissue that is present, it is possible to remove the viscera from the poultry as a viscera set and transport and subsequently further process them as a cohesive viscera set. In order to recover individual viscera, such as the liver, it is thus necessary to detach the connective tissue between the viscera that are to be separated and the remaining viscera set.

By means of the apparatus according to the invention it is ensured that the liver to be separated from the viscera set can be separated reliably and with high quality, that is to say that the liver is separated from the remainder of the viscera set as far as possible without loss and without being damaged. At the same time, the apparatus has a construction of low complexity and, associated therewith, a reduced outlay in terms of the method when recovering the liver. It is additionally advantageous that the apparatus is divided into a detaching device and a separating device, because the liver is first detached cleanly from the connective tissue and, by means of the further downstream separating device, reliable separation of the liver from the viscera set is ensured. In this manner, liver of high quality can be recovered, which is free of contamination, because the two operations are separate from one another and in each case only the viscera set in the region of the liver located therein is processed. Because the apparatus is so configured that the viscera sets can be guided along the conveying line through the detaching section of the detaching device, and that the viscera sets with the detached liver can then be separated by means of the separating device, an apparatus construction with a low degree of complexity is obtained, so that the outlay in terms of construction and manufacture is reduced, which in turn results in efficient production of the apparatus. The upstream detaching device additionally increases the availability of the liver to be detached, because the connective tissue present is thereby purposively detachable, so that, in the downstream separating device, the step of complete separation can take place with separating means of low complexity. The means used therefor are chosen specifically for the operations in question, which contributes to efficient processing. Preferably, the apparatus is free of hydraulic and/or control-electronic means within the scope of the active processing of the viscera sets, which likewise contributes to cost-efficient processing by reducing the outlay in terms of investment and maintenance. The apparatus according to the invention thus results in a higher quality of the liver, an increased yield and low production and operating costs of the apparatus. Furthermore, the holding element allows the viscera set to be arranged specifically. Because the liver can be arranged beneath the receiving region, the further apparatus components can be oriented thereafter in order to perform target-oriented processing. To that end, the liver, with the connective tissue to be detached, is particularly preferably arranged directly beneath the receiving region. Detaching the liver generally results in a change in the position of the liver, so that, by means of the downstream separating device, the liver can be separated completely from the viscera set in a simple manner. Dividing the apparatus into a detaching device and a separating device further offers the advantage that the two devices can be positioned one behind the other along the conveying line, so that the viscera sets can be guided to both devices on the same holding elements and at the same processing speed. As a result, it is not necessary to undertake time-consuming repositioning of the viscera set with the detached liver, but the viscera set can be guided on the same holding element throughout the entire separation operation.

Preferably, a plurality of viscera sets on a plurality of holding elements are continuously conveyed along the conveying line by means of the conveying element, for example a conveying chain. To that end, the viscera sets can be provided on the holding elements manually or in an automated manner. Further preferably, the viscera sets are detached from the slaughtered poultry carcasses and transferred directly to the holding elements in an automated manner. The apparatus for recovering liver can thus either be used as a stand-alone apparatus or be integrated within a more complex poultry processing process.

Preferably, in addition to the liver, further viscera can be separated by means of the apparatus in that at least one further separating device is arranged downstream of the separating device for separating the liver or in that a plurality of viscera are separated together by means of the separating device, which viscera are in turn isolated in further processing steps.

A preferred embodiment is characterised in that at least substantially only the liver can be separated completely from the viscera set by means of the separating device. "At least substantially only the liver" within the meaning of the invention means either only the liver or that the separated liver contains less than 10% of constituents other than liver. It is thus possible to feed the separated liver directly to further processing processes, for example to a packing or packaging apparatus, so that the utilisation and efficiency of the poultry processing is optimised. Furthermore, fewer staff have to be employed, because it is not necessary to isolate and/or sort the separated viscera. It is ensured that only the liver is separated by configuring the detaching device and/or the separating device in such a manner that the detaching means and/or the separating means engages only into the regions in which there is connective tissue connecting the liver with the viscera set. This is ensured, for example, by a suitable choice of the detaching means and/or the separating means. That is to say, in that preferably the detaching means and/or the separating means carry out the detachment or separation only in a corresponding position and orientation in which the corresponding connective tissue is located, so that only the liver can be separated.

An advantageous further development is distinguished in that a discharge device for discharging the separated liver is arranged at least along part of the conveying line in the transport direction T, in particular beneath the detaching device and/or the separating device. In this manner, the separated liver can be discharged directly and can preferably be further processed directly. In particular, the separated liver can be fed directly to a subsequent quality control or packing apparatus. The discharge device is, for example, a conveyor belt. In a particularly advantageous further development, the discharge device is arranged beneath the separating device. Further preferably, the discharge device is so configured and adapted beneath the separating device that it is able to engage into the detached liver, so that the separating operation is additionally assisted.

In a further advantageous embodiment of the invention, the detaching section has an inlet side $L_{ES}$ and an outlet side $L_{AS}$, wherein the part of the viscera set that is arranged beneath the receiving region of the holding element can be guided into the inlet side $L_{ES}$ of the detaching section. The inlet side $L_{ES}$ and the outlet side $L_{AS}$ make possible a defined inlet and outlet region of the viscera set in the detaching section. Over the course of the transport direction T, the inlet side $L_{ES}$ forms the beginning of the detaching section and the outlet side $L_{AS}$ constitutes the end of the detaching section. Because the holding element can be introduced through the inlet side $L_{ES}$ and discharged from the outlet side $L_{AS}$, the viscera set arranged on the holding element passes through the detaching means at the intended positions, whereby the detachment of the corresponding connective tissue takes place. In a particularly advantageous embodiment of the invention, the inlet side $L_{ES}$ and the outlet side $L_{AS}$ are located at least substantially in the same plane. "At least substantially in the same plane" within the meaning of the invention means either in the same plane or approximately in the same plane, that is to say with a deviation from the plane of not more than ±10°.

An expedient embodiment of the invention is characterised in that the detaching means is formed of at least two detaching elements which form a detaching gap and extend at least substantially parallel to one another in the transport direction T, through which the part of the viscera set that is arranged beneath the receiving region of the holding element can be guided. "At least substantially parallel" within the meaning of the invention means either parallel to one another or approximately parallel, that is to say with a deviation of the detaching elements extending parallel to one another of not more than ±10°. Particularly advantageously, individual regions of the detaching elements can have a detaching gap of a different size, wherein the detaching elements continue to be formed at least substantially parallel to one another. The detaching elements are further preferably so chosen that they are suitable for detaching connective tissue that occurs in viscera sets and have, for example, on one side of the detaching element "teeth", also known as toothed blades or toothed knives, with indentations corresponding to the "teeth" on the opposite side of the detaching element. The configuration is an advantageous configuration of the detaching elements. Alternatively, the detaching elements can be in the form of a knife arrangement wherein one of the two detaching elements is in the form of a knife, or wherein both of the detaching elements are in the form of knives. It can further be advantageous that the detaching element has at least one gap for discharging viscera sets from the process, for example.

According to a further preferred embodiment of the invention, the detaching means is divided into a plurality of detaching segments which are arranged one behind the other and have detaching elements, in particular into from 2 to 9 detaching segments arranged one behind the other. In a particularly preferred embodiment, the detaching means is divided into from 3 to 7 segments arranged one behind the other. Dividing the detaching means into a plurality of detaching segments arranged one behind the other has the advantage that, as the viscera sets pass through the detaching means, different distances, that is to say different detaching gaps, between the detaching elements can be formed and configured in the course of the transport direction T. In this manner, it is possible that the detaching elements of the detaching segments in the region of the inlet side $L_{ES}$ are at a greater distance from one another and that the detaching elements of the detaching segments in the region of the outlet side $L_{AS}$ are at a smaller distance from one another. Thus, on the one hand, viscera sets of different sizes can be acted upon and, on the other hand, specific connective tissue can be detached by detaching segments arranged differently. Particularly preferably, at least one of the detaching segments is thus at a greater distance that is to say forms a detaching gap of a different size, from the remaining detaching segments, and/or at least one of the detaching segments has at least one detaching element which differs in terms of function and/or configuration, in particular a different cutting element, from the remainder of the detaching segments.

A further expedient embodiment of the invention is characterised in that at least one detaching element of at least one of the detaching segments is spring-mounted in the horizontal direction. In a particularly expedient embodiment of the invention, at least one of the detaching elements of one of the detaching segments is configured and mounted on the detaching segment to be deflectable against a spring force by means of a spring arrangement comprising a spring element. The detaching elements are thus capable of reliably and gently detaching the connective tissue, and thus the liver, in the case, for example, of an uneven structure of the viscera set or other disrupting influences. In particular, the resilient deflectability of at least one of the detaching elements reduces the risk of damage to the liver and/or further components of the viscera set. The spring elements can be fixed on the one hand to the detaching element and on the other hand to the detaching segment, wherein fixing to other regions of the detaching device can also take place. Instead of the spring elements, other damping elements can also be used. Further preferably, at least one detaching element of at least one of the detaching segments is configured to be adjustable in the horizontal direction in terms of its distance from the further detaching element. In this manner, it is possible variably to adjust the detaching gap that is formed. As a result, the detachment can be adapted individually and precisely to the particular processing process in question, for example to the transport speed of the transport conveyor or the like, in order to ensure precise and reliable detachment of the connective tissue and thus of the liver.

In a further advantageous embodiment of the invention, the separating device has an inlet side $T_{ES}$ and an outlet side $T_{AS}$, wherein the part of the viscera set that is arranged beneath the receiving region of the holding element can be guided into the separating device into the inlet side $T_{ES}$. The inlet side $T_{ES}$ and the outlet side $T_{AS}$ make possible a defined inlet and outlet region of the viscera set with the detached liver into the separating device. Over the course of the transport direction T, the inlet side $T_{ES}$ forms the beginning of the separating device and the outlet side $T_{AS}$ constitutes the end of the separating device, or the region in which the operation of separating the liver from the viscera set takes place. Because the holding element can be introduced through the inlet side $T_{ES}$ and discharged from the outlet side $T_{AS}$, the viscera set arranged on the holding element passes through the separating device in a specified region. In this manner, separation of the liver from the viscera set takes place in a specified region.

A preferred further development of the invention is distinguished in that the inlet side $T_{ES}$ and the outlet side $T_{AS}$ of the separating device are arranged at different heights over the course of the transport direction T along the conveying line, in particular in that the inlet side $T_{ES}$ has a greater height than the outlet side $T_{AS}$. In other words, this means that the inlet side $T_{ES}$ and the outlet side $T_{AS}$ of the separating device lie in different planes, so that the separating device, or the separating means, likewise forms a height difference over the course of the transport direction T. In this manner, there is a height difference, over the course of the transport direction T, between the conveying line with the holding elements and the separating device, or the separating means, and thus also between the viscera set conveyed on the holding element and the separating device, or the separating means. Preferably, the separating means is so configured that it allows the viscera set, in particular the liver, to be retained, so that forces act on the viscera set, in particular the liver, by means of the separating means in order to separate the liver completely from the viscera set. The forces are in particular sufficiently great that complete separation of the liver from the viscera set takes place. Particularly preferably, the conveying line of the holding elements extends over the course of the transport direction T at least substantially in the same plane. In an advantageous embodiment, the gradient between the plane of the inlet side $T_{ES}$ and the plane of the outlet side $T_{AS}$ is in the range from 10° to 25°. This means that the separating device with the separating means has a gradient in the range from 10° to 25°, starting from the conveying line and/or the base of the separating device.

In a further preferred further development of the invention, the inlet side $T_{ES}$ and the outlet side $T_{AS}$ of the separating device are arranged at the same height over the course of the transport direction T along the conveying line, that is to say the inlet side $T_{ES}$ and the outlet side $T_{AS}$ of the separating device lie in the same plane over the course of the transport direction T along the conveying line, wherein the conveying line of the holding elements is configured at a different height in the region of the separating device in the transport direction T. In this manner, over the course of the transport direction T, there is a height difference between the conveying line with the holding elements and the separating device, or the separating means, and thus also between the viscera set conveyed on the holding element and the separating device, or the separating means. The separating means is preferably so configured that it allows the viscera set, in particular the liver, to be retained, so that, on account of the height difference that occurs and the retention of the viscera set, or of the liver, forces act on the viscera set, in particular the liver, by means of the separating means in order to separate the liver completely from the viscera set. The forces are in particular sufficiently great that complete separation of the liver from the viscera set takes place. Particularly preferably, the conveying line of the holding elements extends at least substantially in the same plane over the course of the transport direction T. In an advantageous embodiment, the gradient of the conveying line is in the range from 10° to 25°, starting from the base and/or the separating device.

According to a further preferred embodiment, the outlet side $L_{AS}$ of the detaching section and the inlet side $T_{ES}$ of the separating device lie at least substantially in the same plane over the course of the transport direction along the conveying line. "At least substantially in the same plane" within the meaning of the invention means either in the same plane or approximately in the same plane, that is to say with a distance between the planes of from a few centimetres to 10 cm. In other words, the outlet side $L_{AS}$ of the detaching section and the inlet side $T_{ES}$ are arranged at least substantially at the same height. As a result, simplified transfer of the viscera set conveyed on the conveying line from the detaching device to the separating device can be ensured. This results in more fluid processing and reduces rejects and also damage to the viscera set, or the liver.

In a particularly preferred embodiment, the outlet side $L_{AS}$ of the detaching section and the inlet side $T_{ES}$ of the separating device are spaced apart from one another at least substantially without a gap. "At least substantially without a gap" within the meaning of the invention means either without a gap or almost without a gap, that is to say with a distance of from a few centimetres to 7 cm. In this manner, the transfer behaviour of the viscera set between the detaching device and the separating device is improved. This results in more fluid processing and reduces rejects and also damage to the viscera set, or the liver.

Preferably, the inlet side $L_{ES}$ of the detaching section and/or the inlet side $T_{ES}$ of the separating device is in the form of a funnel and/or so configured that the inner region has rounded edges. The form of the inlet sides on the one hand prevents damage to the viscera set, or the liver, and on the other hand transfer between the devices is facilitated, or assisted, by the form. The described design ensures and assists with precise and gentle processing of the viscera set.

A further expedient embodiment of the invention is characterised in that the separating means is formed of at least two separating elements which form a separating gap and extend at least substantially parallel to one another in the transport direction T, through which the part of the viscera set that is arranged beneath the receiving region of the holding element can be guided. "At least substantially parallel" within the meaning of the invention means either parallel to one another or approximately parallel, that is to say with a deviation of the separating elements extending parallel to one another of not more than ±10°. On the one hand, the holding element with the viscera set can be guided through the separating gap, and on the other hand it is possible for parts of the viscera set that are not to be separated to move away through the separating gap, while the liver that is to be separated is guided and separated on the lower side of the separating elements. The separating elements are in particular so configured that they allow the pre-detached liver to be stripped off. Particularly advantageously, individual regions of the separating elements can have a separating gap of a different size, wherein the separating elements are further formed at least substantially parallel to one another.

An expedient embodiment of the invention is characterised in that the separating elements comprise two planar contact elements which extend in parallel at least substantially in the same plane. By means of the planar contact elements, an element is proposed for guiding the liver beneath the separating elements and separating it over the course of the transport direction.

According to a further preferred embodiment of the invention, the holding element and the separating elements are arranged spaced apart in vertical alignment and with a distance between them, wherein the distance between the holding element conveyed on the conveying line and the separating elements increases over the course of the transport direction T along the conveying line. As a result of the increase in the distance between the holding element and the separating elements over the course of the transport direction T, forces occur on the part of the viscera set that is guided beneath the separating elements. On entering the separating elements of the separating device, the already detached liver is still connected to the viscera set at least in some regions. As a result of the increasing distance and the forces that occur thereby, the detached liver is detached in that the liver is retained by the separating elements while the remainder of the viscera set is deflected through the separating gap. This permits simple separation of the liver, with reduced use of mechanical or control-electronic components.

A preferred further development of the invention is distinguished in that the separating elements have an upper side $T_{OS}$ and a lower side $T_{US}$, wherein the receiving region of the holding element is guided above and/or on the upper side $T_{OS}$ of the separating elements and the part of the viscera set that is arranged beneath the receiving region of the holding element can be guided beneath and/or on the lower side $T_{US}$ of the separating elements. Guiding the respective part of the viscera set on the upper side or lower side ensures that only the regions of the viscera set that are to be in engagement with the separating elements are processed by means of the separating elements. As a result, damage to the liver is avoided and the yield and quality are increased.

A further expedient embodiment of the invention is characterised in that the separating device is so configured that the detached liver is positively guided on the underside $T_{US}$ of the separating elements during complete separation of the liver from the viscera set, and the remaining part of the viscera set guided beneath the receiving region can be guided through the separating gap in the direction towards the upper side $T_{OS}$. In this manner, the liver is retained by the separating elements and, on account of the relative movement of the remainder of the viscera set that occurs by the separating gap, is completely separated. Thus, if further parts of the viscera set are first guided beneath the separating elements, those parts are discharged through the separating gap and the liver is thereby isolated from the viscera set.

According to a further preferred embodiment, the separating elements are in flexible form at least in some regions. Because the separating elements are in flexible form, the entire viscera set is deflected if too high a mechanical load is applied to the viscera set. In order to avoid damage to the apparatus or disruption to the processing procedure, a viscera set can, if required, be discharged from the separating operation as a result of the flexible form of the separating elements. The separating elements can preferably be spring-mounted. Particularly preferably, the separating elements are in flexible form in particular in the region of the separating gap, in order to permit deflection as the viscera set is guided through. The separating elements can further preferably be formed of a flexible material, advantageously selected from the group of the flexible plastics materials, such as SBS, SEBS, TPV, TPE-E, TPU.

In a preferred embodiment, the flat contact elements are likewise in flexible form. The contact elements are formed in particular of a flexible material, in order to permit deflection as the viscera set is guided through. The flexible material can advantageously be selected from the group of the flexible plastics materials, such as SBS, SEBS, TPV, TPE-E, TPU.

A further expedient embodiment of the invention is characterised in that the flat contact elements are formed on the separating device to be movable at least in some regions perpendicularly in the direction towards the upper side $T_{OS}$, wherein the separating gap between the separating elements can be made larger. This prevents damage to the apparatus and/or a disruption in the processing procedure in that, as a result of the enlargement of the separating gap, a viscera set can, if required, be discharged from the separating device during the separating operation.

An advantageous further development is distinguished in that the size of the detaching gap and/or of the separating gap is configured to be adjustable, wherein the size of the detaching gap is preferably between 5 and 50 millimetres and the size of the separating gap is preferably between 3 and 30 millimetres. The size is in each case to be understood as meaning the distance between the opposing elements. In this manner, in the case of the detaching gap, a reliable size is provided for providing a clean detaching operation, while with the size of the separating gap, a reliable size is provided for on the one hand retaining the liver and on the other hand discharging the regions of the viscera set that are not to be separated off and are guided beneath the separating elements. The adjustability is achieved, for example, by means of adjusting elements, such as, for example, screws for adjusting the corresponding elements.

The object is also achieved by a method, wherein the viscera sets at least comprise lungs, liver, proventriculus and gizzard which are connected together at least in part by connective tissue, comprising the steps: providing the viscera sets to be processed on a viscera conveying device, comprising at least one holding element, guided along a conveying line in a transport direction T, having a receiving region for receiving and for holding the viscera set or parts thereof, positioning the viscera sets so that the lungs are arranged above the receiving region and at least the liver, the proventriculus and the gizzard are arranged beneath the receiving region, guiding the viscera sets into a detaching device arranged in the transport direction T along the conveying line, detaching in some regions a connective tissue connecting the liver with the viscera set, guiding the viscera set with the liver detached from the connective tissue in a separating device arranged downstream of the detaching device in the transport direction T along the conveying line, completely separating the liver from the viscera set by means of the separating device.

In order to avoid repetition, reference will be made in connection with the method according to the invention to the advantages already outlined in detail in connection with the apparatus according to the invention. These apply analogously also to the method according to the invention described hereinbelow.

A further development is characterised in that the detachment of the liver takes place in that the part of the viscera set that is arranged beneath the receiving region of the holding element is guided through a detaching section of the detaching device, wherein the connective tissue connecting the liver with the viscera set is detached, and in that complete separation of the liver takes place in that the detached liver is separated completely from the viscera set by means of a separating means of the separating device, in that the detached liver is moved relatively between the holding element and the separating means.

In a further advantageous embodiment of the invention, at least substantially only the liver is separated completely from the viscera set by means of the separating device.

An expedient embodiment of the invention is characterised in that the separated liver is discharged by means of a discharge device arranged along at least part of the conveying line in the transport direction T, in particular beneath the detaching device and/or the separating device.

According to a further preferred embodiment of the invention, the part of the viscera set that is arranged beneath the receiving region of the holding element is guided through two detaching elements of the detaching means which form a detaching gap and extend at least substantially parallel to one another in the transport direction T.

A further expedient embodiment of the invention is characterised in that the part of the viscera set that is arranged beneath the receiving region of the holding element is guided through two separating elements of the separating means which form a separating gap and extend at least substantially parallel to one another in the transport direction T.

A preferred further development of the invention is distinguished in that, over the course of the transport direction T along the conveying line, the distance between the holding element conveyed on the conveying line and the separating elements is increased.

A further expedient embodiment of the invention is characterised in that the holding element is guided above and/or on an upper side $T_{OS}$ having the separating elements, and the part of the viscera set that is arranged beneath the receiving region of the holding element is guided beneath and/or on a lower side $T_{US}$ having the separating elements.

A preferred further development of the invention is distinguished in that the detached liver, during complete separation of the liver from the viscera set, is positively guided on the lower side $T_{US}$ of the separating elements of the separating device, and the remaining part of the viscera set that is guided beneath the receiving region is moved through the separating gap in the direction towards the upper side $T_{OS}$ relative to the separating elements.

Particularly preferably, the method is carried out with an apparatus as disclosed herein.

The advantages and effects arising therefrom have already been described in connection with the apparatus so that, in order to avoid repetition, reference is made to the preceding passages.

BRIEF DESCRIPTION OF THE DRAWINGS

Further expedient and/or advantageous features and further developments of the apparatus and of the method will become apparent from the description. Particularly preferred embodiments of the apparatus and the method will be explained in greater detail with reference to the accompanying drawing, in which:

FIG. 5b is a schematic side view of the separating device shown in FIG. 5a as viscera sets pass through.

DETAILED DESCRIPTION OF THE INVENTION

Figure 1:
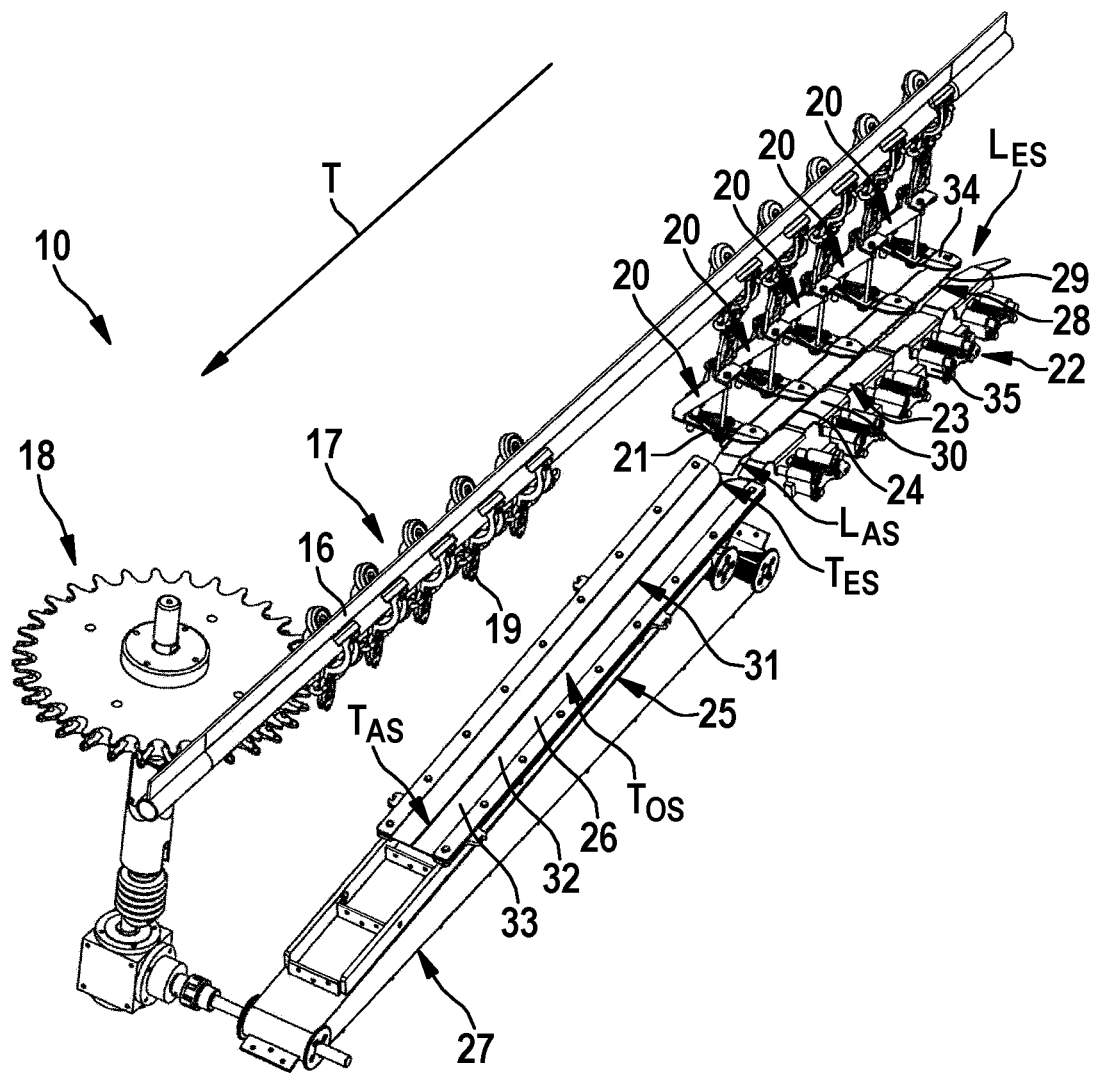
FIG. 1 is a perspective view of a schematic representation of an apparatus according to the invention.

The apparatus according to the invention and the method according to the invention are described with reference to the above-mentioned figures. In order to avoid repetition, the statements made in relation to the apparatus also apply to the method according to the invention, so that statements are made hereinbelow only on selected aspects of the method according to the invention, isolated from the apparatus according to the invention.

The apparatus shown in the drawing is configured and adapted for recovering, that is to say in particular for detaching or for separating, liver or parts thereof from viscera sets of poultry carcasses. However, the apparatus can likewise be used for detaching or separating further viscera or organs from viscera sets of poultry carcasses.

Figure 5A:
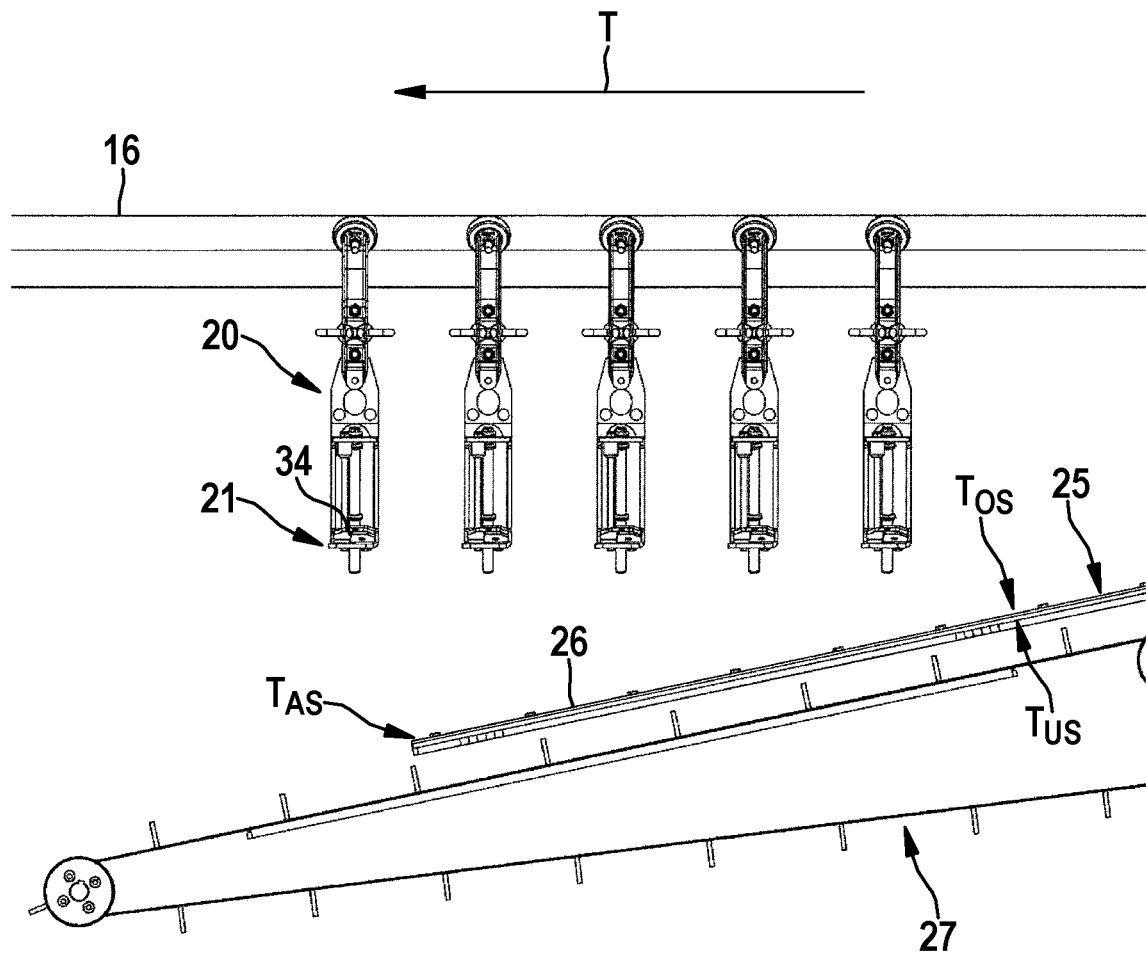
FIG. 5a is a schematic side view of a separating device of the apparatus shown in FIG. 1.
Figure 5B:
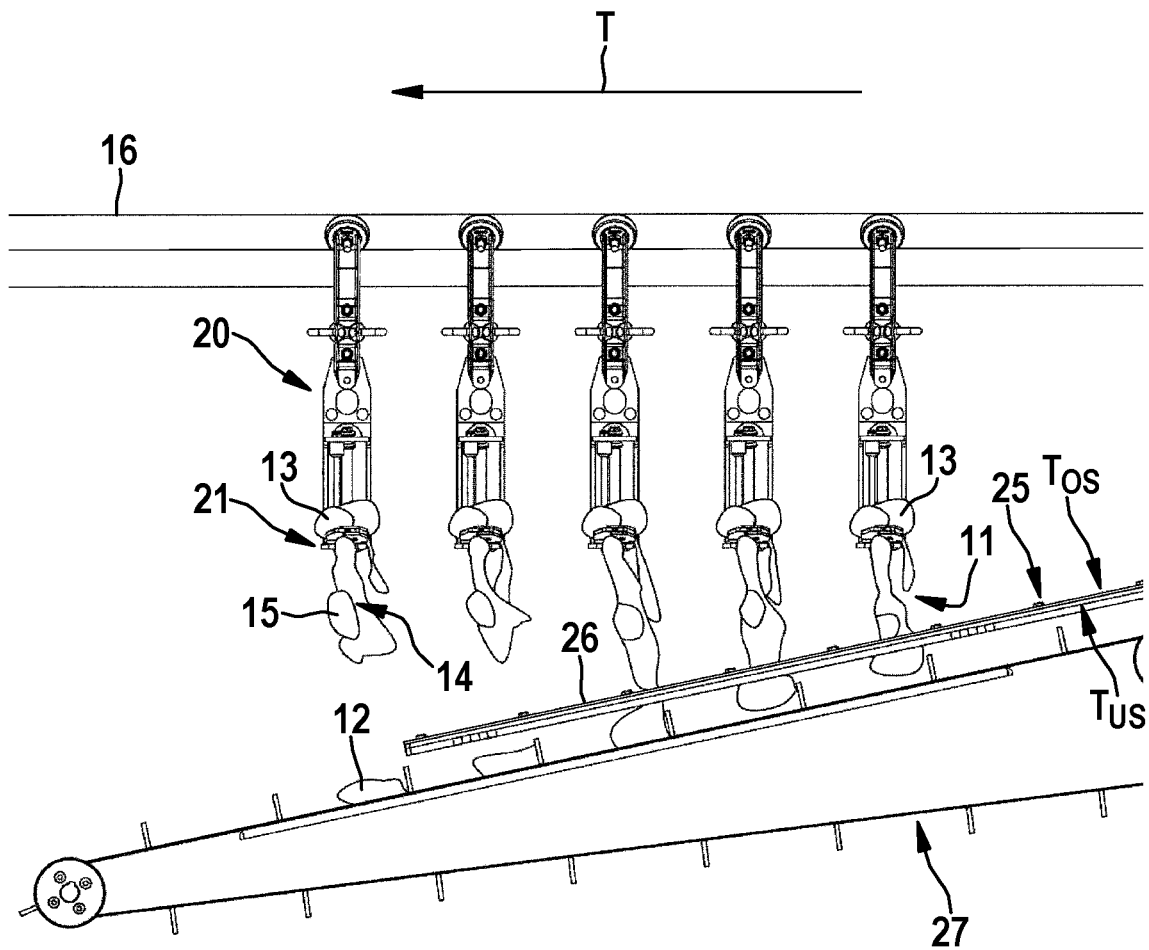

The apparatus 10 shown is configured and adapted for recovering liver 12 or parts thereof from viscera sets 11 of poultry bodies—not shown in the figures, wherein the viscera sets 11 comprise at least lungs 13, liver 12, proventriculus 14 and gizzard 15, which are connected together at least in part by connective tissue, comprising a viscera conveying device 17, configured for conveying the viscera sets 11 in a suspended manner along a conveying line 16 in a transport direction T, having a drive unit 18 and a conveying element 19 for conveying at least one holding element 20, wherein the at least one holding element 20 comprises a receiving region 21 for receiving and for holding the viscera set 11 or parts thereof, and wherein the holding element 20 is so configured that at least the lungs 13 can be arranged above the receiving region 21 and at least the liver 12, the proventriculus 14 and the gizzard 15 can be arranged beneath the receiving region 21 (see FIG. 3b), a detaching device 22, arranged in the transport direction T along the conveying line 16, having a detaching section 23, comprising a detaching means 24 for detaching the liver 12, wherein the detaching device 22 is so configured that at least a connective tissue connecting the liver 12 with the viscera set 11 can be detached from the viscera set 11 in some regions by the detaching means 24, a separating device 25, arranged downstream of the detaching device 22 in the transport direction T along the conveying line 16, comprising a separating means 26, wherein the separating means 26 is so configured that the liver 12 detached from the connective tissue can be separated completely from the viscera set 11 (see FIG. 5b).

For better understanding of the invention, the anatomy of the viscera sets 1, or parts thereof, that are to be processed by means of the invention will first be described. The apparatus according to the invention is configured and adapted in particular for the automatic or semi-automatic processing of viscera sets 11, wherein the viscera sets comprise at least lungs 13, liver 12, proventriculus 14 and gizzard 15. Generally, such viscera sets further comprise heart, kidneys, gall bladder, oesophagus and intestines. In the present figures, the viscera set 11 is shown only schematically and in highly simplified form, without depicting specific anatomical features of the above-mentioned viscera. The viscera 11 are connected together by means of connective tissue, in the present figures the connective tissue is not shown in detail. Connective tissue within the meaning of the invention is to be regarded as being all connections which can occur between viscera of poultry. Connective tissues include in particular fatty tissue, cartilaginous tissue, sinews, ligaments. (blood) vessels and skin. The connective tissue connects the viscera of poultry naturally. Owing to the connective tissue that is present, it is possible to detach the viscera from the poultry as a complete viscera set 11 and transport and supply them to a processing line as a cohesive viscera set 11. In order to recover individual viscera such as the liver 12, it is accordingly necessary to detach the connective tissue between the viscera to be separated and the remaining viscera 11. Overall, the actual structure of the viscera set 11, that is to say which viscera the viscera set 11 contains, is incidental to the use according to the invention of the apparatus. However, it is important within the meaning of the invention that the part of the viscera 11 containing the liver 12 is arranged beneath the receiving region 21 of the holding element 20, which is apparent, for example, from FIGS. 3b and 3c.

Figure 3A:
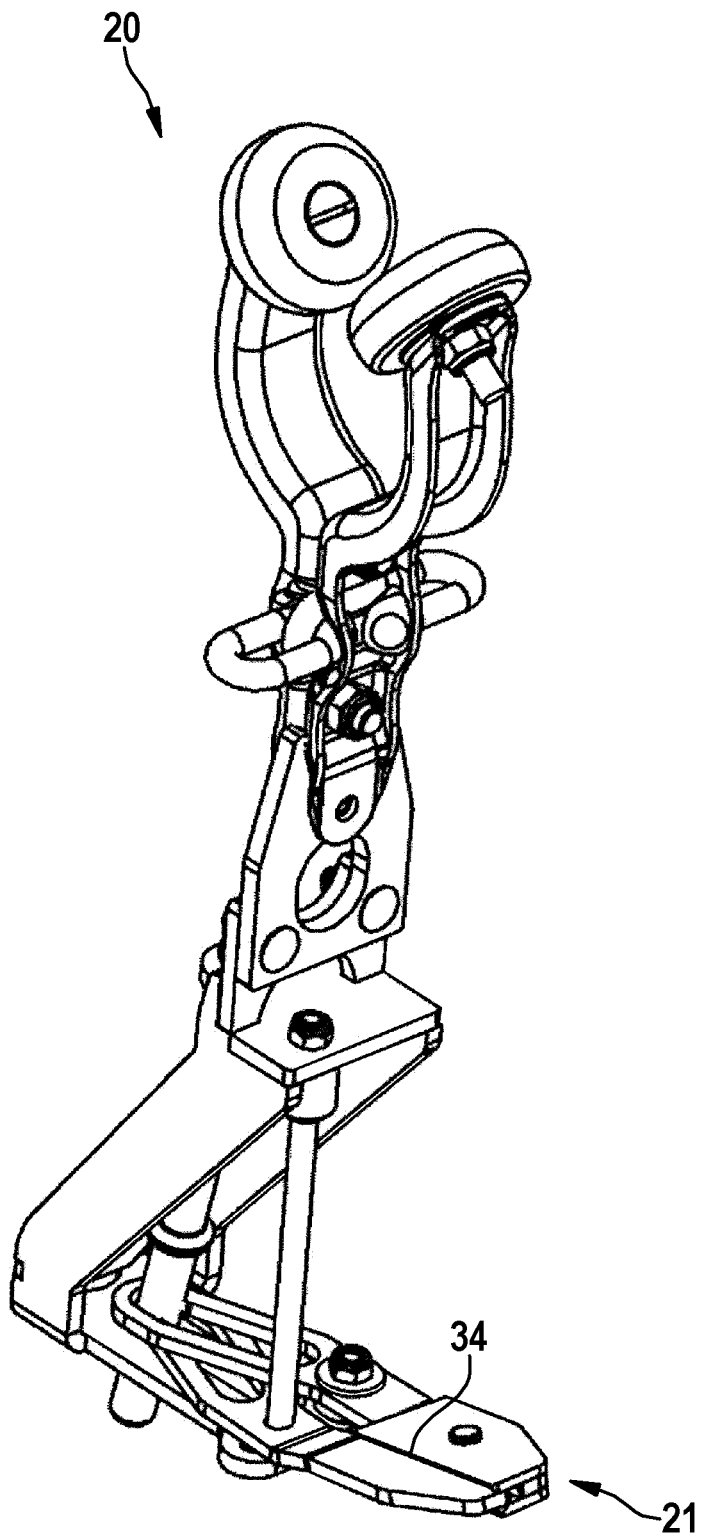
FIG. 3a is a schematic detail view of a holding element of the apparatus shown in FIG. 1.
Figure 3B:
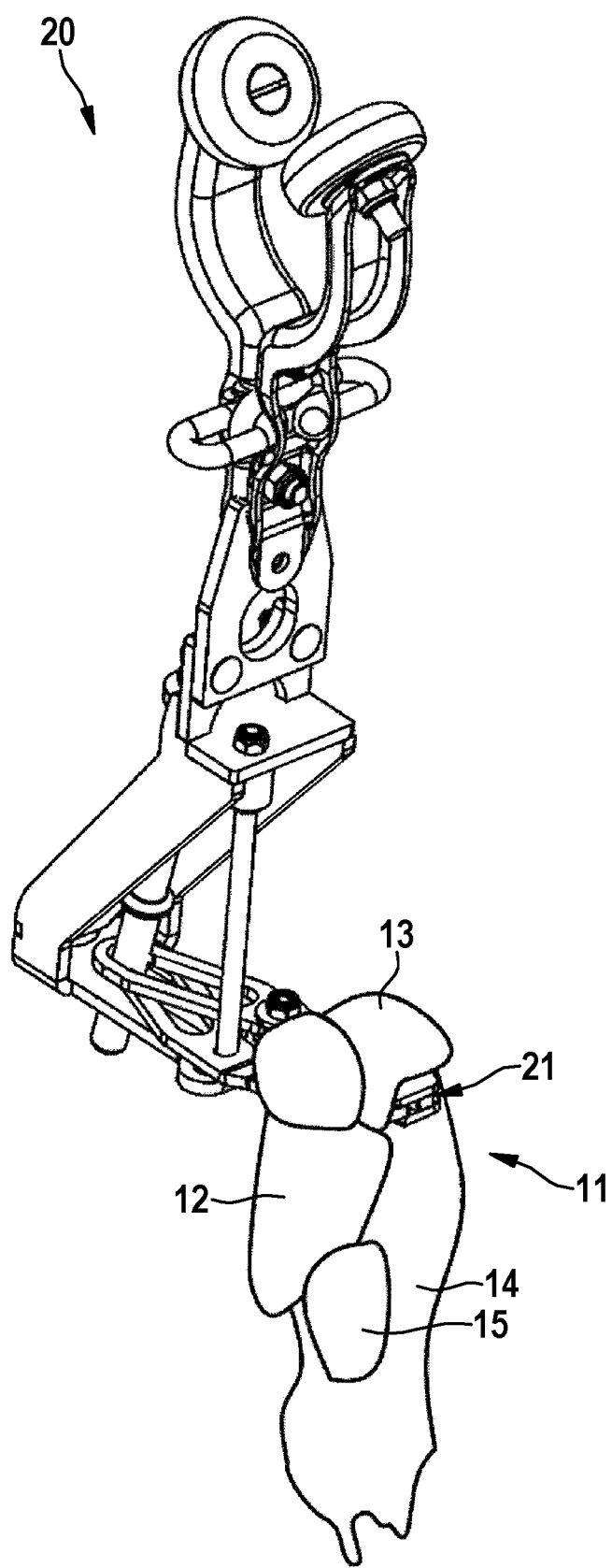
FIG. 3b is a schematic detail view of the holding element shown in FIG. 3a with a viscera set.
Figure 3C:
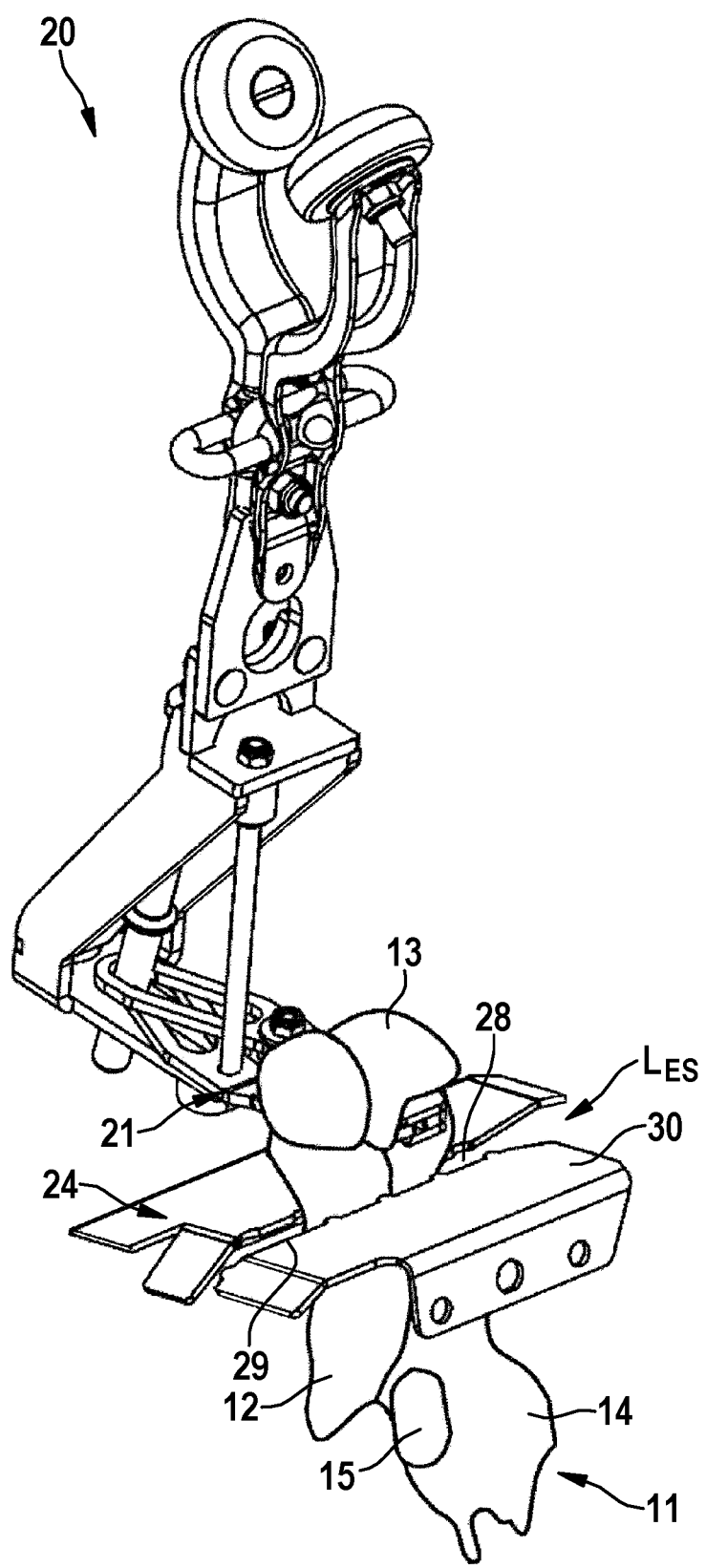
FIG. 3c is a schematic detail view of the holding element shown in FIG. 3b with a viscera set as it passes through a region of the detaching device.

In FIGS. 3b and 3c, a viscera set 11 of a chicken is shown in stylised form, which viscera set is arranged suspended from the receiving region 21 of the holding element 20. In this case, the holding element 20 has as the receiving region 21 two clamp elements 34 (see FIG. 3a) which are movable towards one another and which are configured and adapted to receive, or clamp, the viscera set 11. The holding element 20 with the clamp elements 34 is so configured that the viscera set 11 can be so positioned that the lungs 13 are arranged above the receiving region 21 in the form of the clamp elements 34 and that at least the livers 12 are arranged beneath the receiving region 21 in the form of the clamp elements 34. However, the invention functions equally as well if further viscera, such as, for example, the heart or the oesophagus, are likewise arranged above the receiving region 21, and/or if further viscera, such as the kidneys, gall bladder, are arranged beneath the receiving region 21. It is also pointed out that, although a stylised viscera set 11 of a chicken is used as an example here, viscera sets 11 of other poultry, such as ducks, geese, turkeys, pigeons or quails, can be held and processed substantially in the same manner. The viscera sets 11 can be arranged on the holding element 20 both manually and mechanically.

The features and further developments described hereinbelow constitute preferred embodiments when considered on their own or in combination with one another. It is expressly pointed out that features which are combined the description and/or the drawing or described in a common embodiment can also constitute a further development of the apparatus 10 described hereinbefore functionally independently.

As is apparent from FIG. 5b, preferably at least substantially only the liver 12 can be separated completely from the viscera set 11 by means of the separating device 25. The remaining part of the viscera set 11 is conveyed further along the conveying line 16 on the holding elements 20. Further preferably, the remaining part of the viscera set 11 is processed further on apparatuses—not shown in the drawings. As is shown in FIGS. 1, 2, 4 and 5, a plurality of holding elements 20 each with viscera sets 11 arranged thereon are particularly preferably arranged on the viscera conveying device 17 and guided continuously or discontinuously through the respective devices on the apparatus 10.

The expression conveying line 16 refers to the line along the viscera conveying device 17 on which the devices for detaching or separating the liver 12 are or can be arranged, and ultimately describes a three-dimensional region which the viscera sets 11 cover or pass through when they are conveyed in the transport direction T. When something lies in the conveying line 16 of the viscera sets 11, for example the detaching device 22 or the separating device 25, the viscera set 11 collides therewith or comes into engagement therewith or interacts therewith. The transport direction T represents the course of the conveyed holding elements 20 on the viscera conveying device 17, and thus also the course of the viscera sets 11 that are guided, whereby the respective processing steps on the viscera sets 11 are also specified.

Figure 4A:
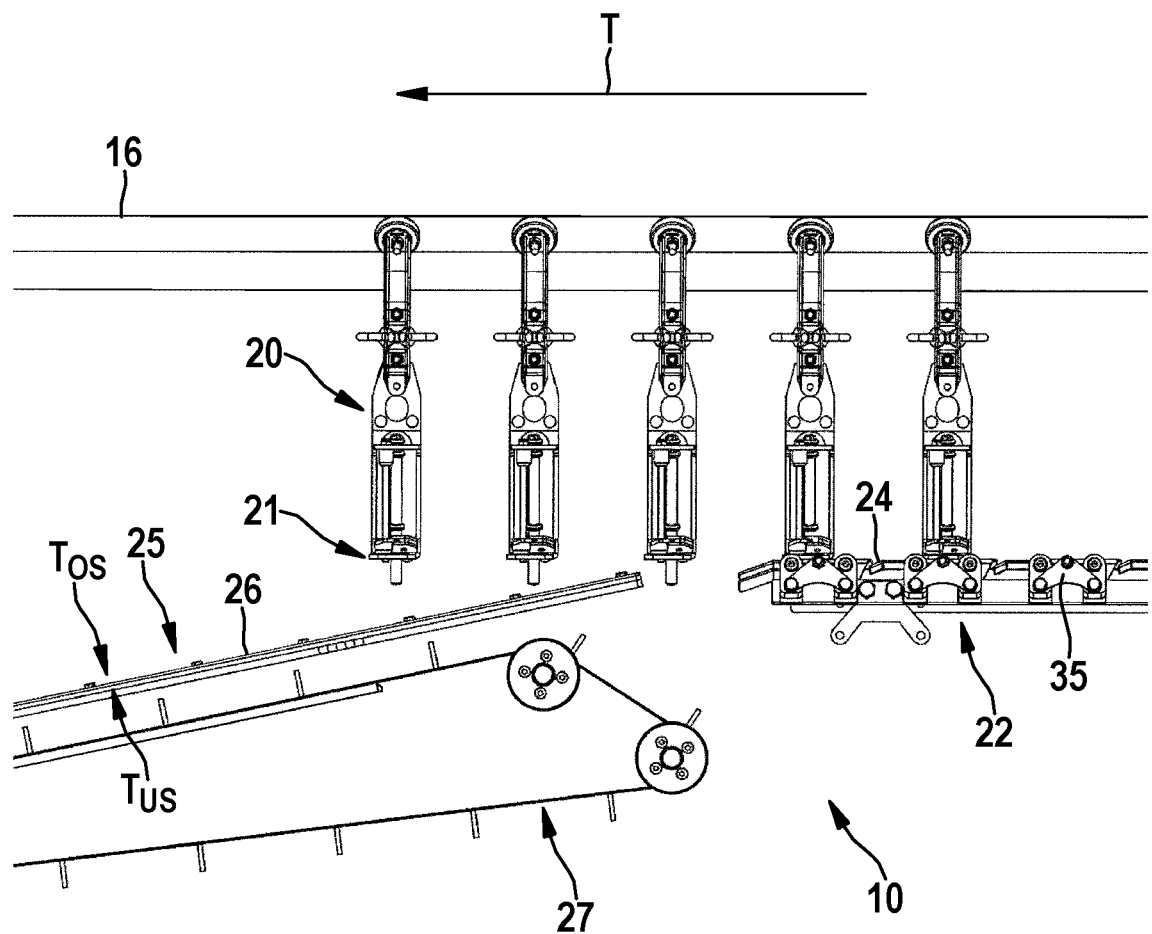
FIG. 4a is a schematic side view of the apparatus shown in FIG. 1.

Preferably, a discharge device 27 for discharging the separated liver 12 is arranged along at least part of the conveying line 16 in the transport direction T, in particular beneath the detaching device 22 and/or the separating device 25. In FIGS. 1, 4 and 5, the discharge device 27 is shown only beneath the separating device 25. The discharge device 27 is thus positioned in the region of the apparatus 10 in which the liver 12 is potentially separated and transferred. As is shown, for example, in FIG. 5b, the discharge device 27 is divided into separate discharge regions into each of which a separated liver 12 can be discharged. The separate discharge regions are preferably operated at the same processing speed as the viscera conveying device, so that synchronous discharge takes place. If separation of the liver 12 by means of the separating means 26 does not take place completely, the separating walls arranged between the separate discharge regions can assist complete separation of the liver 12 by an additional interaction.

Further preferably, the detaching section 23 has an inlet side $L_{ES}$ and an outlet side $L_{AS}$, wherein the part of the viscera set 11 that is arranged beneath the receiving region 21 of the holding element 20 can be guided into the inlet side $L_{ES}$ of the detaching section 23. As is apparent from FIG. 2, the inlet side $L_{ES}$ is preferably formed with rounded corners and/or in the form of a funnel, in order to permit simplified introduction of the viscera sets into the detaching section 23.

The detaching means 24 is preferably formed of at least two detaching elements 29 which form a detaching gap 28 and extend at least substantially parallel to one another in the transport direction T, through which the part of the viscera set 11 that is arranged beneath the receiving region 21 of the holding element 20 can be guided. The part of the viscera set 11 with the liver 12 that is arranged beneath the receiving region 21 of the holding element in particular is thus guided between the detaching gap 28 and thus brought into engagement with the detaching elements 29. As the viscera set passes through, the connecting tissue connecting the liver 12 with the viscera set 11 is detached at least in some regions. The operation of detaching the liver from the viscera set 11 by means of the detaching device 22 can be seen in FIG. 4b.

Figure 2:
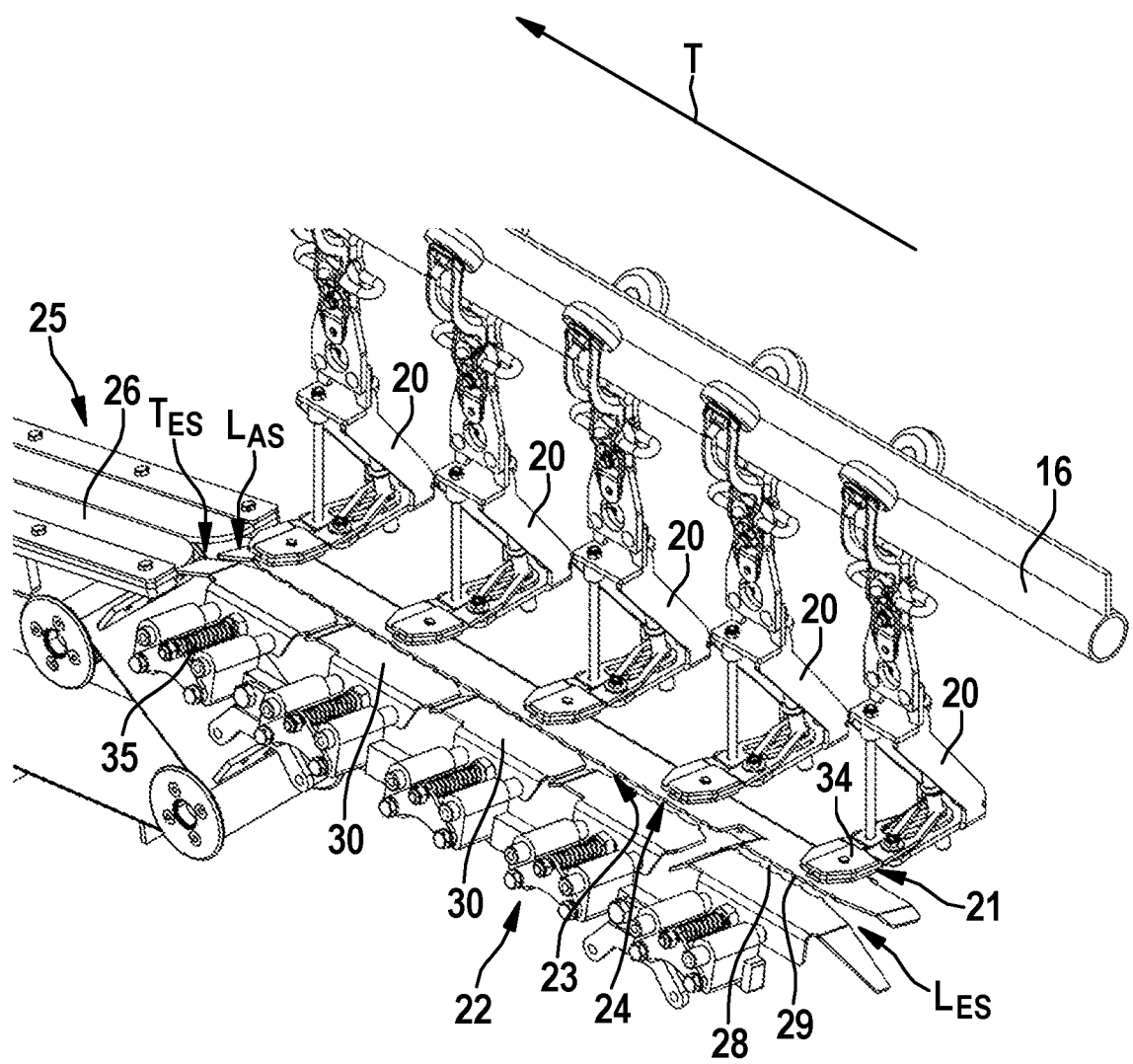
FIG. 2 is a schematic detail view of a detaching device of the apparatus shown in FIG. 1.

The detaching means 24 can preferably be divided into a plurality of detaching segments 30 which are arranged one behind the other and have detaching elements 29, in particular into from 2 to 9 detaching segments 30 arranged one behind the other. In FIG. 1, the detaching device 22 is shown by way of example with five detaching segments 30 arranged one behind the other. In FIG. 3c, the viscera set 11 is inside a detaching segment 30, wherein detachment of the liver 12 from the viscera set takes place by detachment of the connective tissue that is present, in that the holding element 20 guides the viscera set 11 in the transport direction T between the detaching elements 29 of the detaching segment 30, wherein connective tissue that is present is cut through, for example, by means of the detaching elements 29. At least one of the detaching segments 29 can further be spring-mounted in the horizontal direction. In FIG. 1 and FIG. 2, all of the detaching segments are shown with an adjustable spring arrangement 35. The spring arrangements 35 are preferably configured to be adjustable in terms of spring force and the distance of the detaching elements 29 from one another, in order to adjust the deflection of the viscera set 11 which can be guided through.

The separating device 25 further preferably has an inlet side $T_{ES}$ and an outlet side $T_{AS}$, wherein the part of the viscera set 11 that is arranged beneath the receiving region 21 of the holding element 20 can be guided into the separating device 25 into the inlet side $T_{ES}$. The outlet side $T_{AS}$ is formed not only by a single local region, but can in particular represent the entire region of the separating elements 32 in which the viscera set 11 separated from the liver 12 can be guided out of the separating device 25 in the direction towards the holding element 20. The inlet side $T_{ES}$ is preferably formed with rounded corners and/or in the form of a funnel, in order to permit simplified introduction of the viscera sets into the separating device 25. As is shown in FIG. 4 and FIG. 5, the inlet side $T_{ES}$ and the outlet side $T_A$s of the separating device 25 are arranged at different heights, for example, over the course of the transport direction T along the conveying line 16, the inlet side $T_{ES}$ in particular has a greater height than the outlet side $T_{AS}$.

Figure 4B:
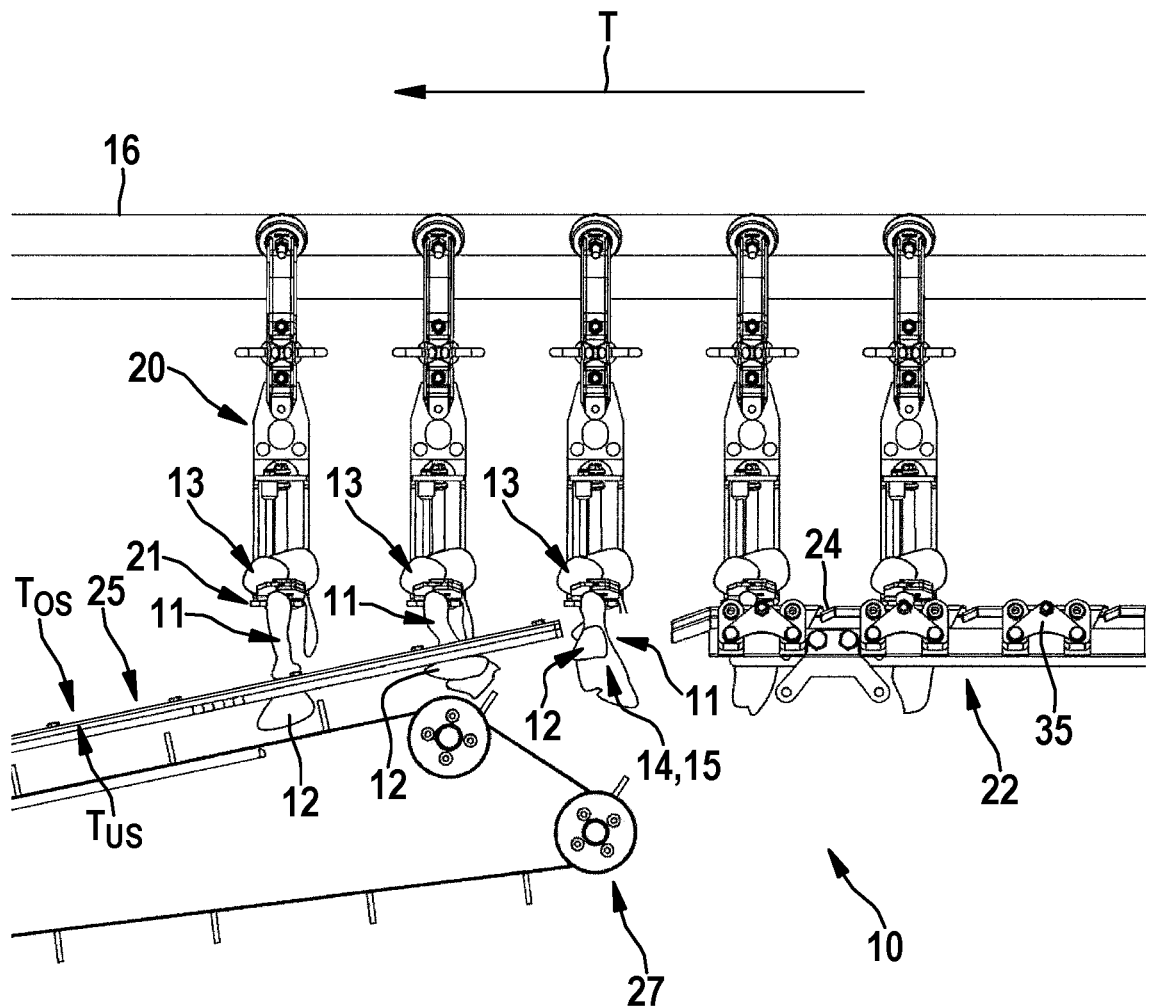
FIG. 4b is a schematic side view of the apparatus shown in FIG. 4a with conveyed viscera sets.

FIG. 2 and FIG. 4 show that the outlet side $L_{AS}$ of the detaching section 23 and the inlet side $T_{ES}$ of the separating device 25 advantageously lie at least substantially in the same plane over the course of the transport direction T along the conveying line 16. In FIG. 4b it will additionally be seen that, in this manner, reliable transfer of the viscera set 11 with the detached liver 12 from the detaching section 23 of the detaching device 22 to the separating device 25 takes place, whereby the liver 12 can be positioned beneath the separating elements 32.

Preferably, the separating means 26 is formed of at least two separating elements 32 which form a separating gap 31 and extend at least substantially parallel to one another in the transport direction T, through which the part of the viscera set 11 that is arranged beneath the receiving region 21 of the holding element 20 can be guided. The separating elements 32 are preferably two planar contact elements 33 extending in parallel at least substantially in the same plane. Further preferably, the holding element 20 and the separating elements 32 are arranged spaced apart in vertical alignment and at a distance from one another, wherein the distance between the holding element 20 conveyed on the conveying line 16 and the separating elements 32 increases over the course of the transport direction T along the conveying line 16.

In FIG. 4b and FIG. 5b, the operation of separating the liver 12, or the arrangement and guiding of the liver in the separating device 25, is shown. FIG. 4b shows in particular that the part of the viscera set 11 with the already detached liver 12 that is arranged beneath the receiving region 21 of the holding element is guided between the separating gap 31 and thus is in contact with the separating elements 32. As the viscera sets 11 are conveyed on the holding elements 20, the liver 12 is guided beneath the separating elements 32 in the transport direction T.

Advantageously, the separating elements 32 have an upper side $T_{OS}$ and a lower side $T_{US}$, wherein the holding element 20 is guided above and/or on the upper side $T_{OS}$ of the separating elements 32 and the part of the viscera set 11 that is arranged beneath the receiving region 21 of the holding element 20 can be guided beneath and/or on the lower side $T_{US}$ of the separating elements 32. Further preferably, the separating device 25 is so configured that the detached liver 12 is positively guided on the lower side $T_{US}$ of the separating elements 32 during complete separation of the liver 12 from the viscera set 11, and the remaining part of the viscera set 11 that is guided beneath the receiving region 21 can be guided through the separating gap 31 in the direction towards the upper side $T_{OS}$. As a result of the positive guiding of the liver 12 at the separating elements 32, it is guided in direct contact on the lower side $T_{US}$, whereby, as the liver is conveyed further along the conveying line 16 in the transport direction T, complete separation of the liver 12 takes place.

FIG. 5 shows part of the separating device 25 in which the distance between the holding elements 20 and the separating elements 32 increases along the conveying line 16 in the transport direction T, wherein the liver 12 is separated completely from the remaining viscera set 11. The part of the viscera set 11 separated from the liver 12 thereby escapes through the separating gap 31. The separating elements 32 are for that purpose preferably in flexible form at least in some regions.

Preferably, the flat contact elements 33 are formed on the separating device 25 to be movable perpendicularly in the direction towards the upper side $T_{OS}$ at least in some regions, wherein the separating gap 31 between the separating elements 32 can be made larger. The movability can be generated on the one hand by a suitable choice of material for the separating elements 32 and/or the contact elements 33, and/or on the other hand by movable elements, such as, for example, spring elements, formed on the separating means 26.

For guiding the viscera set through the detaching section 23 or through the separating device, the size of the detaching gap 28 and/or of the separating gap 31 can further preferably be adjustable, wherein the size of the detaching gap 28 is preferably between 5 and 50 millimetres and the size of the separating gap 31 is preferably between 3 and 30 millimetres.

The invention claimed is:

1. An apparatus, configured and adapted for the recovery of liver from viscera sets of poultry carcasses, wherein the viscera sets comprise at least lungs, liver, proventriculus and gizzard, which are connected together at least in part by connective tissue, comprising;

a viscera conveying device, adapted to convey the viscera sets in a suspended manner along a conveying line in a transport direction, having a drive unit and a conveying element for conveying at least one holding element, wherein the at least one holding element comprises a receiving region for receiving and for holding the viscera set, and wherein the holding element is so configured that at least the lungs are arranged above the receiving region and at least the liver, the proventriculus and the gizzard are arranged beneath the receiving region;

a detaching device arranged in the transport direction along the conveying line and having a detaching section comprising a detaching means for detaching the liver, wherein the detaching device is so configured that at least a connective tissue connecting the liver with the viscera set is detached from the viscera set in some regions by the detaching means, a separating device arranged downstream of the detaching device along the conveying line in the transport direction and comprising a separating means, wherein the separating means is so configured that the liver detached from the connective tissue is separated completely from the viscera set.

2. The apparatus according to claim 1, wherein at least substantially only the liver is separated completely from the viscera set by the separating device.

3. The apparatus according to claim 1, further comprising a discharge device for discharging the separated liver arranged along at least part of the conveying line in the transport direction, beneath the detaching device and/or the separating device.

4. The apparatus according to claim 1, wherein the detaching section has an inlet side and an outlet side, wherein a part of the viscera set that is arranged beneath the receiving region of the holding element is guided into the inlet side of the detaching section.

5. The apparatus according to claim 1, wherein the detaching means is formed of at least two detaching elements which form a detaching gap and extend at least substantially parallel to one another in the transport direction, through which the part of the viscera set that is arranged beneath the receiving region of the holding element is guided.

6. The apparatus according to claim 1, wherein the detaching means is divided into a plurality of detaching segments which are arranged one behind the other and have detaching elements, into from 2 to 9 detaching segments arranged one behind the other.

7. The apparatus according to claim 6, wherein at least one of the detaching elements of at least one of the detaching segments is spring-mounted in a horizontal direction.

8. The apparatus according to claim 1, wherein the separating device has an inlet side and an outlet side, wherein a part of the viscera set that is arranged beneath the receiving region of the holding element is guided into the separating device into the inlet side.

9. The apparatus according to claim 8, wherein the inlet side and the outlet side of the separating device are arranged at different heights over a course of the transport direction along the conveying line, in that the inlet side has a greater height than the outlet side.

10. The apparatus according to claim 4, wherein the outlet side of the detaching section and the inlet side of the separating device lie at least substantially in a same plane over a course of the transport direction along the conveying line.

11. The apparatus according to claim 1, wherein the separating means is formed of at least two separating elements forming a separating gap and extending at least substantially parallel to one another in the transport direction, through which a part of the viscera set that is arranged beneath the receiving region of the holding element is guided.

12. The apparatus according to claim 11, wherein the separating elements comprise two planar contact elements extending in parallel at least substantially in a same plane.

13. The apparatus according to claim 11, wherein the holding element and the separating elements are arranged spaced apart in vertical alignment and with a distance between them, wherein the distance between the holding element conveyed on the conveying line and the separating elements increases over a course of the transport direction along the conveying line.

14. The apparatus according to claim 11, wherein the separating elements have an upper side and a lower side, wherein the receiving region of the holding element is guided above and/or on the upper side of the separating elements and the part of the viscera set that is arranged beneath the receiving region of the holding element is guided beneath and/or on the lower side of the separating elements.

15. The apparatus according to claim 11, wherein the separating device is so configured that the detached liver is positively guided on the lower side of the separating elements during the complete separation of the liver from the viscera set, and a remaining part of the viscera set guided beneath the receiving region is guided through the separating gap in a direction towards the upper side.

16. The apparatus according to claim 11, wherein the separating elements are in flexible form at least in some regions.

17. The apparatus according to claim 12, wherein the planar contact elements are formed on the separating device to be movable perpendicularly in a direction towards an upper side of the separating elements at least in some regions, wherein the separating gap between the separating elements is configured to be made larger.

18. The apparatus according to claim 1, wherein a size of a detaching gap and/or of a separating gap is adjustable, wherein the size of the detaching gap is preferably between 5 and 50 millimetres and the size of the separating gap is between 3 and 30 millimetres.

19. A method for recovering liver from viscera sets of poultry carcasses, wherein the viscera sets comprise at least lungs, liver, proventriculus and gizzard, which are connected together at least in part by connective tissue, comprising the steps:
providing the viscera sets to be processed on a viscera conveying device comprising at least one holding element guided along a conveying line in a transport direction and having a receiving region for receiving and for holding the viscera set;
positioning the viscera sets so that the lungs are arranged above the receiving region and at least the liver, the proventriculus and the gizzard are arranged beneath the receiving region;
guiding the viscera sets into a detaching device arranged in the transport direction along the conveying line;
detaching in some regions a connective tissue connecting the liver with the viscera set;
guiding the viscera set with the liver detached from the connective tissue in a separating device arranged downstream of the detaching device in the transport direction along the conveying line; and
completely separating the liver from the viscera set by the separating device.

20. The method according to claim 19, wherein the detachment of the liver takes place in that the part of the viscera set that is arranged beneath the receiving region of the holding element is guided through a detaching section of the detaching device, wherein the connective tissue connecting the liver with the viscera set is detached, and in that complete separation of the liver takes place in that the detached liver is separated completely from the viscera set by a separating means of the separating device in that the detached liver is moved relatively between the holding element and the separating means.

21. The method according to claim 19, wherein at least substantially only the liver is separated completely from the viscera set by the separating device.

22. The method according to claim 19, wherein the separated liver is discharged by a discharge device arranged along at least part of the conveying line in the transport direction, beneath the detaching device and/or the separating device.

23. The method according to claim 19, wherein the part of the viscera set that is arranged beneath the receiving region of the holding element is guided through at least two detaching elements of the detaching means which form a detaching gap and extend at least substantially parallel to one another in the transport direction.

24. The method according to claim 19, wherein the part of the viscera set that is arranged beneath the receiving region of the holding element is guided through two separating elements of the separating means which form a separating gap and extend at least substantially parallel to one another in the transport direction.

25. The method according to claim 24, wherein the distance between the holding element conveyed on the conveying line and the separating elements increases over a course of the transport direction along the conveying line.

26. The method according to claim 24, wherein the holding element is guided above and/or on an upper side having the separating elements, and the part of the viscera set that is arranged beneath the receiving region of the holding element is guided beneath and/or on a lower side having the separating elements.

27. The method according to claim 19, wherein the detached liver is positively guided on the lower side of the separating elements of the separating device during the complete separation of the liver from the viscera set, and a remaining part of the viscera set guided beneath the receiving region is moved through the separating gap in the direction towards the upper side $T_{OS}$ relative to the separating elements.

28. The method according to claim 19, wherein the method is carried out with an apparatus according to claim 1.

* * * * *